United States Patent
Lee et al.

(10) Patent No.: US 9,231,235 B2
(45) Date of Patent: Jan. 5, 2016

(54) BATTERY PACK

(75) Inventors: Seong-Joon Lee, Yongin-si (KR); Ki-Sik Pak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 275 days.

(21) Appl. No.: 13/605,127

(22) Filed: Sep. 6, 2012

(65) Prior Publication Data

US 2013/0149562 A1 Jun. 13, 2013

(30) Foreign Application Priority Data

Dec. 9, 2011 (KR) .................. 10-2011-0132084

(51) Int. Cl.
*H01M 2/02* (2006.01)
*H01M 2/04* (2006.01)
*H01M 2/06* (2006.01)
*H01M 2/08* (2006.01)
*H01M 2/34* (2006.01)
*H01M 10/42* (2006.01)
*H01M 10/04* (2006.01)

(52) U.S. Cl.
CPC .............. *H01M 2/0469* (2013.01); *H01M 2/06* (2013.01); *H01M 2/348* (2013.01); *H01M 10/425* (2013.01); *H01M 2/08* (2013.01); *H01M 10/0436* (2013.01); *H01M 2200/103* (2013.01); *H01M 2200/106* (2013.01)

(58) Field of Classification Search
USPC ....... 429/7, 163–187; 174/257, 261; 29/623.1–623.5
See application file for complete search history.

(56) References Cited

U.S. PATENT DOCUMENTS

| | | | | |
|---|---|---|---|---|
| 8,709,645 B2 * | 4/2014 | Roy | | 429/185 |
| 2006/0035141 A1 * | 2/2006 | Lee | | 429/176 |
| 2006/0068275 A1 * | 3/2006 | Chung et al. | | 429/121 |
| 2006/0266542 A1 * | 11/2006 | Yoon | | 174/112 |
| 2007/0154785 A1 | 7/2007 | Seo et al. | | |
| 2008/0176131 A1 * | 7/2008 | Byun et al. | | 429/122 |
| 2009/0087693 A1 * | 4/2009 | Kim et al. | | 429/8 |
| 2009/0155631 A1 * | 6/2009 | Baek et al. | | 429/7 |
| 2009/0269620 A1 * | 10/2009 | Kim | | 429/7 |
| 2010/0092859 A1 * | 4/2010 | Kim et al. | | 429/178 |
| 2011/0171498 A1 * | 7/2011 | Baek | | 429/7 |
| 2012/0208047 A1 * | 8/2012 | Park et al. | | 429/7 |

FOREIGN PATENT DOCUMENTS

KR 2005-0096288 A 10/2005
KR 0770097 B1 10/2007
KR 2009-0027067 A 3/2009

* cited by examiner

*Primary Examiner* — Basia Ridley
*Assistant Examiner* — Caitlin Wilmot
(74) *Attorney, Agent, or Firm* — Knobbe Martens Olson & Bear LLP

(57) ABSTRACT

A battery pack includes a pouch-type bare cell, a protecting circuit module, a top case and a protecting circuit module support part. The pouch-type bare cell has a sealing region positioned in an extraction direction of an electrode lead. The protecting circuit module is positioned in the sealing region and connected to the electrode lead. The top case surrounds the protecting circuit module. The protecting circuit module support part is provided between the top case and the protecting circuit module. Accordingly, the protecting circuit module support part is formed between the top case and the protecting circuit module, so that it is possible to prevent a component mounted on the protecting circuit module from being damaged by an external impact and to prevent the inflow of a foreign matter from the outside of the battery pack, thereby improving the reliability and safety of the battery pack.

14 Claims, 3 Drawing Sheets

BATTERY PACK

RELATED APPLICATIONS

This application claims priority to and the benefit of Korean Patent Application No. 10-2011-0132084, filed on Dec. 9, 2011, in the Korean Intellectual Property Office, the entire content of which is incorporated herein by reference.

BACKGROUND

1. Field

An aspect of the present invention relates to a battery pack, and more particularly, to a battery pack capable of preventing or inhibiting damage of a component mounted in a protecting circuit module from an external impact.

2. Description of the Related Art

In general, secondary batteries refer to rechargeable batteries, unlike primary batteries that cannot be recharged. The secondary batteries are widely used in the field of electronic devices such as a cellular phone, a notebook computer and a camcorder.

Among various kinds of secondary batteries, a lithium secondary battery is widely used because of its high operating voltage and high energy density per unit weight. The lithium secondary battery is manufactured in several shapes, and cylinder-type, can-type and pouch-type secondary batteries are used as representative shapes of the lithium secondary batteries.

The pouch-type secondary battery is formed by inserting an electrode assembly into a pouch and sealing the pouch, and an electrode lead connected to an electrode tab of the electrode assembly is connected to a component such as a protecting circuit module (PCM) or positive temperature coefficient (PTC), thereby forming a core pack. A top case for surrounding the PCM is formed at an upper part of the core pack, and the core pack is built in a hard case or surrounded by a label for packing, thereby forming a battery pack.

SUMMARY

Embodiments provide a battery pack in which a protecting circuit module support part is formed between a top case and a mounting surface of a component of a protecting circuit module, so that it is possible to prevent damage of the component mounted in the protecting circuit module from an external impact and to prevent the inflow of a foreign matter from the outside of the battery pack.

Embodiments also provide a battery pack in which a protecting circuit module support part allows a surface on which a safety device, such as a thermal fuse or positive temperature coefficient (PTC), is formed to be adhered more closely to a top case, so that it is possible to improve the operational performance of the safety device. That is, when a bare cell is abnormally overheated, the heat of the bare cell is more effectively transferred to the safety device, thereby improving the operational performance of the safety device.

According to an aspect of the present invention, there is provided a battery pack including: a pouch-type bare cell having a sealing region positioned in an extraction direction of an electrode lead; a protecting circuit module positioned in the sealing region and connected to the electrode lead; a top case surrounding the protecting circuit module; and a protecting circuit module support part provided between the top case and the protecting circuit module.

The protecting circuit module support part may be formed to face a component mounted on the protecting circuit module.

The top case may be integrally formed with the protecting circuit module support part.

The protecting circuit module support part may be formed of at least one selected from the group consisting of foam, rubber and glue.

The top case may be formed in a '⊏' shape.

The top case may surround a mounting surface of the component of the protecting circuit module, a connection surface between the protecting circuit module and the electrode lead and the other surface that is a surface opposite to one surface of the protecting circuit module, facing the sealing region.

An insulating tape may be further formed on an outer surface of the electrode lead positioned in the sealing region.

The top case may have a groove formed in a region corresponding to the electrode lead.

The insulating tape may be formed to extend up to the outer surface of the electrode lead corresponding to the groove of the top case.

An adhesive may be further formed between a top surface of the bare cell and the top case.

The battery pack may further include an outer tape covering the top case and an upper part of the bare cell.

In another aspect the present invention comprises a battery pack comprising a pouch-type bare cell having a sealing region positioned in an extraction direction of an electrode lead, a protecting circuit module positioned adjacent the sealing region and connected to the electrode lead and a top case surrounding the protection circuit module. In this aspect, the battery pack further comprises a protecting circuit module support part provided between the top case and the protecting circuit module wherein the protecting circuit module is resilient so as to absorb forces being transmitted between the top case and the protecting circuit module to inhibit damage to the protection circuit module as a result of external forces exerted against the battery pack.

According to the present invention, a protecting circuit module support part is formed between a mounting surface of a component of a protecting circuit module and a top case, so that it is possible to protect the component from an external impact and to prevent the insertion of a foreign matter, thereby ensuring the reliability and stability of the battery pack.

Further, the protecting circuit module support part allows a surface on which a safety device such as a thermal fuse or positive temperature coefficient (PTC) of the protecting circuit module is formed to be adhered more closely to the top case, so that when a bare cell is abnormally overheated, the heat of the bare cell is more effectively transferred to the safety device, thereby improving the operational performance of the safety device.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
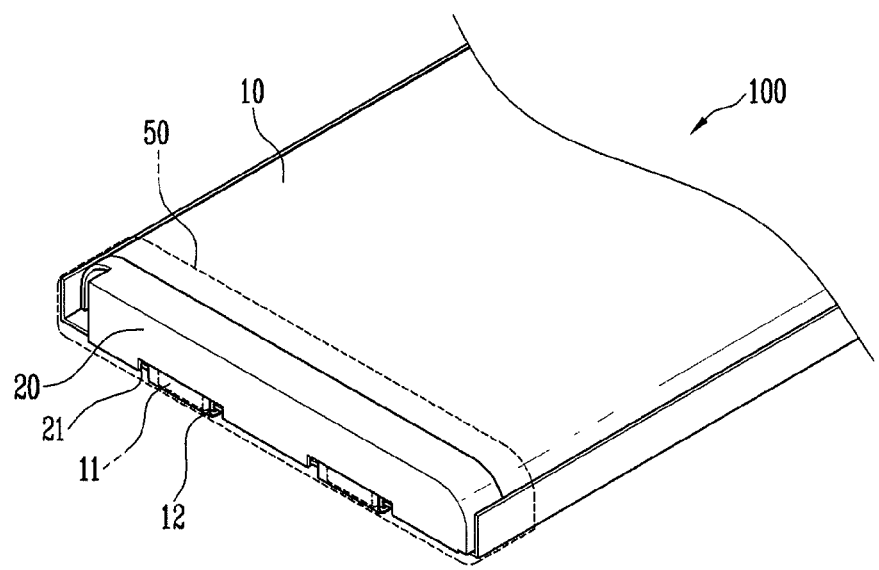
FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 2:
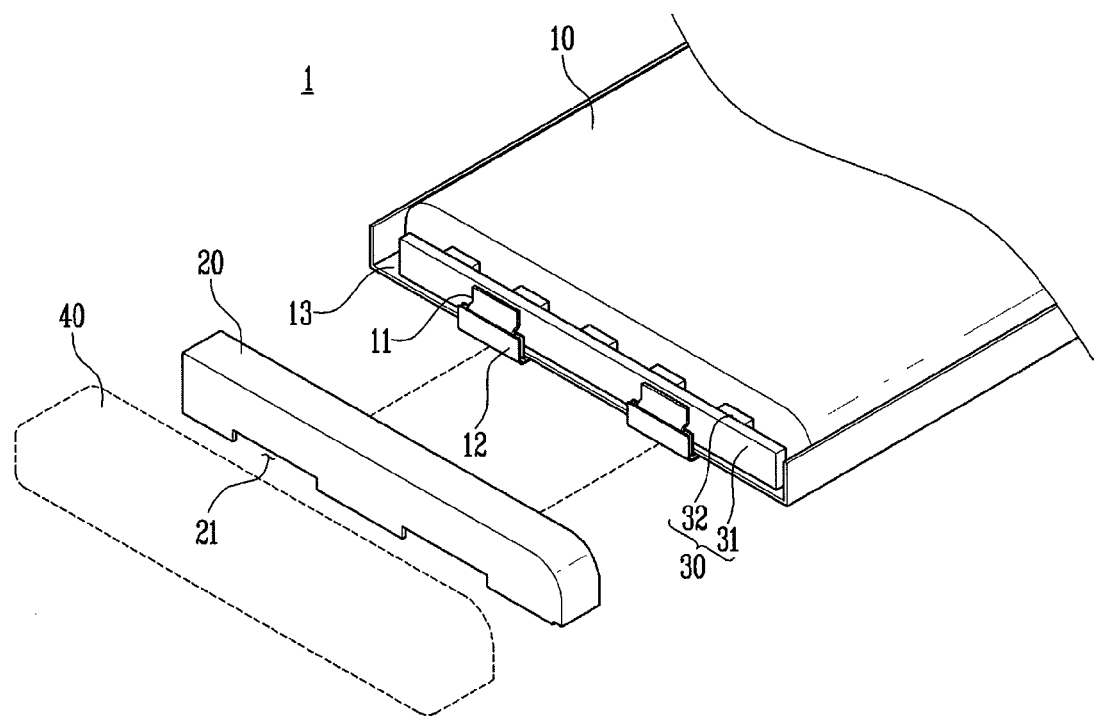
FIG. 2 is an exploded perspective view showing a state in which a top case is separated from the battery pack according to the embodiment of the present invention.

FIG. 1 is a perspective view of a battery pack according to an embodiment of the present invention. FIG. 2 is an exploded perspective view showing a state in which a top case is separated from the battery pack according to the embodiment of the present invention.

Referring to FIGS. 1 and 2, the battery pack 100 according to this embodiment includes a pouch-type bare cell 10, a protecting circuit module 30, a top case 20 surrounding the protecting circuit module 30, and a protecting circuit module support part 40 provided between the top case 20 and the protecting circuit module 30.

The pouch-type bare cell 10 accommodates an electrode assembly (not shown) in the inside thereof, and has a sealing region 13 positioned in the extraction direction of an electrode lead 11 connected to an electrode tab of the electrode assembly. The protecting circuit module 30 connected to the electrode lead 11 is positioned at or adjacent the sealing region 13. In this case, the top case 20 may be formed in a '⊏' shape so as to surround the protecting circuit module 30.

That is, the top case 20 may surround a mounting surface of a component 32 of the protecting circuit module 30, a connection surface between a protecting circuit board 31 and the electrode lead 11 and the other surface of the protecting circuit module 30, which is a surface opposite to one surface of the protecting circuit module 30 facing the sealing region 13. Here, the protecting circuit module support part 40 is formed to face the component 32 mounted on the protecting circuit board 31. Accordingly, it is possible to prevent or inhibit the component 32 from being damaged when an impact between the component 32 and the top case 20 occurs due to an external impact.

In this case, the component mounted on the protecting circuit board 31 may be a safety device such as a thermal fuse or a positive temperature coefficient (PTC). Accordingly, the protecting circuit module support part 40 allows a surface on which the safety device is formed to be adhered more closely to the top case 20, thereby improving the operational performance of the safety device. That is, when the bare cell 10 is abnormally overheated, the protecting circuit module support part 40 more effectively transfers the heat of the bare cell 10 to the safety device, thereby improving the operational performance of the safety device.

The protecting circuit module support part 40 may be formed of at least one selected from the group consisting of foam, rubber and glue. It will be apparent that the protecting circuit module support part 40 may be formed of another material capable of performing a buffering function. In this case, the protecting circuit module support part 40 may be integrally formed by being attached to the top case 20 by an adhesive. Although not shown in these figures, a separate structure capable of fixing the protecting circuit module support part 40 may be formed in the top case 20.

When the protecting circuit module 30 has a defect, the battery pack 100 having the protecting circuit module support part 40 can repair the protecting circuit module 30 by separating the top case 20 from the bare cell 10. In this case, an adhesive 60 (See FIG. 4) may be formed on a top surface of the bare cell 10 coming in contact with the top case 20. However, when a protecting circuit module is molding-treated by an injection molding method using resin for hot melting, the resin is molded to the protecting circuit module. Therefore, when the protecting circuit module has a defect, it is not easy to repair the protecting circuit module by separating the top case from the bare cell. However, in the battery pack 100 according to this embodiment, it is easy to repair the protecting circuit module 30 when the protecting circuit module 30 has a defect.

Hereinafter, components of the battery pack according to the present invention will be described.

The electrode assembly is accommodated in the inside of a pouch of the pouch-type bare cell 10, and the pouch-type bare cell 10 has the sealing region 13 positioned in the extraction direction of the electrode lead 11 connected to the electrode tab of the electrode assembly. Parts respectively positioned at both sides of the sealing region 13 in the extraction direction of the electrode lead 11 are adhered closely to the pouch while being bent to sides of the pouch.

A metal thin plate, such as an aluminum thin plate formed by performing an insulation process on the surface thereof, is frequently used as the pouch. For example, in the pouch, casted polypropylene (CPP) that is polymer resin is coated as a thermal adhesive layer on an aluminum thin plate, and a resin material such as nylon or polyethylene terephthalate (PET) is formed on the outer surface of the thermal adhesive layer.

The electrode assembly accommodated in the inside of the pouch has a structure in which a positive electrode plate, a negative electrode plate and a separator interposed therebetween are sequentially stacked or wound. Electrode tabs attached to the positive and negative electrode plates of the electrode assembly are electrically connected to electrode leads 11 having different polarities, respectively. Parts of the electrode leads 11 are exposed to the sealing region 13 of the pouch so as to be electrically connected to the protecting circuit module 30 in a subsequent process.

In this case, an insulating tape 12 is further formed on an outer surface of each of the electrode leads 11 positioned at the sealing region 13. The insulating tape 12 may be formed so as to improve the sealing force between the electrode lead 11 and the pouch and to ensure an electrical insulation state.

The protecting circuit module 30 is positioned at the sealing region 13 of the bare cell 10, and has positive and negative electrode terminals electrically connected to the respective electrode leads on one surface thereof The other surface of the protecting circuit module 30 has a form in which various types of electronic components 32 are mounted on the protecting circuit board 31 having a protecting circuit part printed therein.

The top case 20 surrounds the protecting circuit module 30 so as to protect the protecting circuit module 30, and is mounted on the top surface of the bare cell 10, i.e., the sealing region 13 of the bare cell 10. In the top case 20, a groove 21 is formed in a region corresponding to each of the electrode leads 11 so as to avoid or limit interference between the top case 20 and the electrode leads 11. In this case, the insulating tape 21 is formed to extend up to an outer surface of the electrode lead 11 exposed through the groove 21 of the top case 20, so that it is possible to prevent or inhibit a short circuit between the top case 20 and the electrode lead 11.

An outer tape 50 is formed to cover the top case 20 and an upper part of the bare cell 10 in a state in which the bare cell 10 and the protecting circuit module 30 are connected to each other and the top case 20 surrounds the protecting circuit module 30. That is, the outer tape 50 covers the upper part of the bare cell 10, so that the top case 20 can be easily fixed to the sealing region 13 of the bare cell 10.

Figure 3:
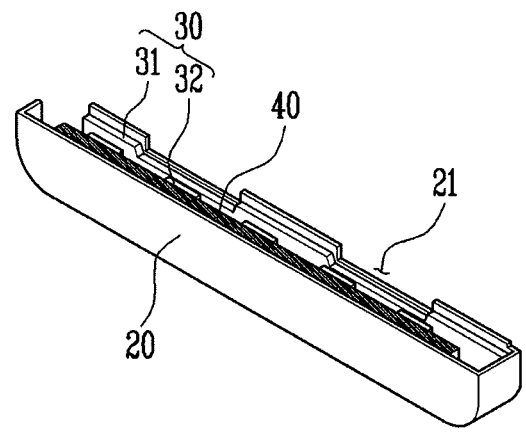
FIG. 3 is a perspective view showing a state in which a protecting circuit module and a protecting circuit module support part are inserted into the inside of the top case according to the embodiment of the present invention.

FIG. 3 is a perspective view showing a state in which a protecting circuit module and a protecting circuit module support part are inserted into the inside of the top case according to the embodiment of the present invention.

Referring to FIG. 3, it can be seen that the protecting circuit module 30 and the protecting circuit module support part 40 are inserted into the inside of the top case 20. The top case 20 is formed in the 'ᑎ' shape so as to surround the protecting circuit module 30 and the protecting circuit module support part 40. Here, the top case 20 may surround the mounting surface of the component 32 of the protecting circuit module 30, the connection surface between the protecting circuit module 30 and the electrode lead 11 (See FIG. 2) and the other surface that is the opposite surface to the one surface of the protecting circuit module 30, facing the sealing region 13 (See FIG. 2).

In this case, the protecting circuit module support part 40 is positioned between the top case and the mounting surface of the component 32 of the protecting circuit module 30. Therefore, the protecting circuit module support part 40 may be formed to face the component 32 mounted on the protecting circuit board 31. The protecting circuit module support part 40 is formed of an insulative material with elasticity, so that although an impact between the top case 20 and the protecting circuit module 30 occurs due to an external impact, it is possible to protect the component 32 from the impact.

Figure 4:
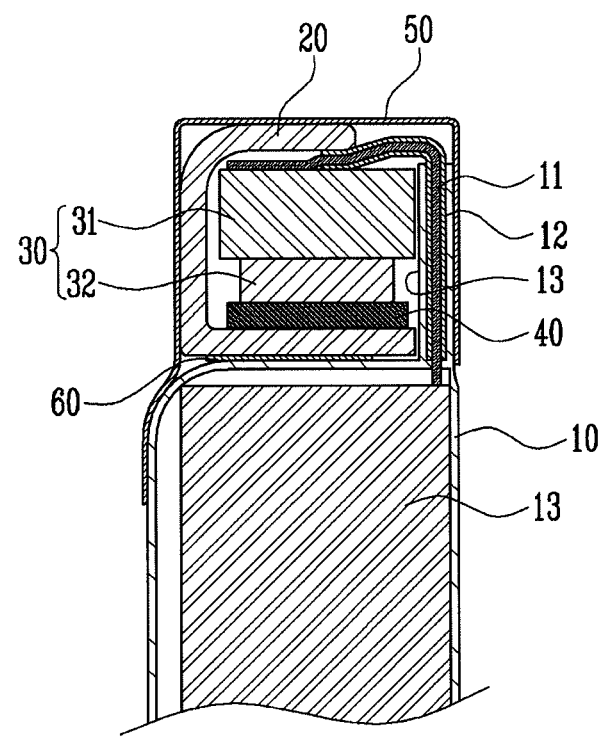
FIG. 4 is a sectional view taken along line A-A' of FIG. 2.

FIG. 4 is a sectional view taken along line A-A' of FIG. 2.

Referring to FIG. 4, the pouch-type bare cell 10 has the sealing region 13 positioned in the extraction direction of the electrode lead 11. The electrode lead 11 is extracted through the sealing region 13 of the pouch-type bare cell 10, and the insulating tape 12 is formed on the outer surface of the electrode lead 11 coming in contact with the sealing region 13. The electrode lead 11 is electrically connected to one surface of the protecting circuit board 31, and the component 32 is mounted on the other surface of the protecting circuit board 31, to which the electrode lead 11 is not connected.

The protecting circuit module 30, which is electrically connected to the bare cell 10 and mounted on the sealing region 13 of the bare cell 10, is surrounded and protected by the top case 20. That is, the top case 20 is formed in the 'ᑎ' shape so as to surround three surfaces of the protecting circuit module 30 except the side of the protecting circuit module 30, facing the sealing region 13 of the bare cell 10.

The 'ᑎ'-shaped top case 20 is formed to surround the mounting surface of the component 32 of the protecting circuit module 30, the connection surface between the protecting circuit module 30 and the electrode lead 11 and the other surface that is the opposite surface to the one surface of the protecting circuit module 30, facing the sealing region 13. In this case, the protecting circuit module support part 40 is formed between the top case 20 and the mounting surface of the component 32 of the protecting circuit module 30. The protecting circuit module support part 40 functions to absorb an impact caused between the top case 20 and the component 32 of the protecting circuit module 30. Accordingly, it is possible to protect the component 32 from an external impact.

An adhesive 60 may be further formed between the top surface of the bare cell 10 and the top case 20. Accordingly, the top case 20 can be easily fixed to the top of the bare cell 10. The outer tape 50 is further formed to cover the top case 20 and the upper part of the bare cell 10, so that the top case 20 can be more firmly fixed to the top of the bare cell 10.

Figure 5:
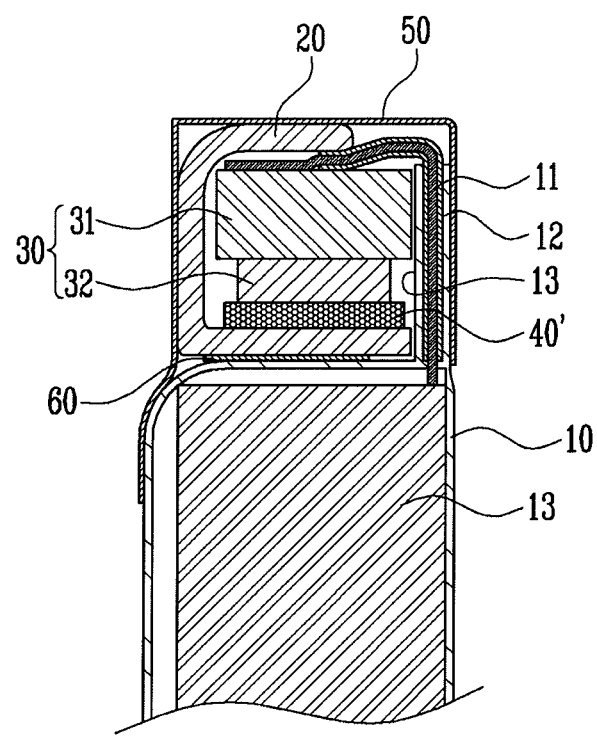
FIG. 5 is a sectional view of a battery pack according to another embodiment of the present invention.

FIG. 5 is a sectional view of a battery pack according to another embodiment of the present invention.

Referring to FIG. 5, the battery pack according to this embodiment includes components identical to those of the embodiment shown in FIG. 4. The battery pack according to this embodiment is different from the embodiment shown in FIG. 4 in that a protecting circuit module support part 40' is formed of foam. Therefore, in FIG. 5, descriptions of the components identical to those of the embodiment shown in FIG. 4 will be omitted.

The protecting circuit module support part 40' according to this embodiment is formed of foam so as to have a characteristic in which the shape of the protecting circuit module support part 40' is changed when a load is applied to the protecting circuit module support part 40' and is easily restored when the load is removed from the protecting circuit module support part 40'. Thus, although an impact between the top case 20 and the mounting surface of the component 32 of the protecting circuit board 30 occurs due to an external impact, the protecting circuit module support part 40' performs a buffering function, so that it is possible to protect the component 32 from the impact. The foam refers to a foaming agent such as rubber, vinyl or polyurethane, and is formed in the shape of a very fine sponge having a plurality of pores formed therein.

Although not shown in this figure, a tape may be attached to both surfaces of the foam when the protecting circuit module support part 40' is formed of the foam. Accordingly, the tape can be easily attached to each of the components 32 of the protecting circuit module 30 and the top case 20.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a pouch-type bare cell having a sealing region positioned in an extraction direction of an electrode lead, wherein the pouch-type bare cell has a top surface wherein the top surface of the pouch-type bare cell is perpendicular to the extraction direction of the electrode lead;
   a protecting circuit module positioned adjacent the sealing region and connected to the electrode lead;
   a top case surrounding the protecting circuit module wherein the top case defines a C-shape havin a first and a second leg with an inner and an outer surface having an opening and wherein the outer surface of the first leg of the top case is mounted on the top surface of the pouch-type bare cell with an adhesive interposed between the outer surface of the first leg and the top surface of the pouch-type bare cell so that the opening extends in a direction that is perpendicular to the direction of the top surface of the pouch-type bare-cell; and a protecting circuit module support part provided between the top case and the protecting circuit module wherein the opening in the top case is greater in width than the thickness of the protecting circuit module support part and the protecting circuit module when stacked together and wherein the electrode lead extends into the top case and is connected to the protecting circuit module via the opening in the top case.

2. The battery pack according to claim 1, wherein the protecting circuit module support part is formed to face a component mounted on the protecting circuit module.

3. The battery pack according to claim 2, wherein the component is a thermal fuse or positive temperature coefficient (PTC) component.

4. The battery pack according to claim 1, wherein the top case is integrally formed with the protecting circuit module support part.

5. The battery pack according to claim 1, wherein the protecting circuit module support part is formed of at least one selected from the group consisting of foam, rubber and glue.

6. The battery pack according to claim 5, wherein a tape is attached to both surfaces of the foam or rubber.

7. The battery pack according to claim 1, wherein the top case surrounds a mounting surface of the protecting circuit module, a connection surface between the protecting circuit module and the electrode lead and the other surface that is a surface opposite to one surface of the protecting circuit module, facing the sealing region.

8. The battery pack according to claim 1, wherein an insulating tape is further formed on an outer surface of the electrode lead positioned in the sealing region; and wherein the top case has a groove formed in a region corresponding to the electrode lead.

9. The battery pack according to claim 8, wherein the insulating tape is formed to extend up to the outer surface of the electrode lead corresponding to the groove of the top case.

10. The battery pack according to claim 1, further comprising an outer tape covering the top case and an upper part of the bare cell.

11. A battery pack comprising:

a pouch-type bare cell having a sealing region positioned in an extraction direction of an electrode lead, wherein the pouch-type bare cell has a top surface wherein the top surface of the pouch-type bare cell is perpendicular to the extraction direction of the electrode lead;

a protecting circuit module positioned adjacent the sealing region and connected to the electrode lead;

a top case surrounding the protection circuit module wherein the top case defines a C-shape having an opening having a first and a second leg with an inner and an outer surface and wherein outer surface of the first legthe top case is mounted on the top surface of the pouch-type bare cell with an adhesive interposed between the outer surface of the first leg and the top surface of the pouch-type bare cell so that the opening extends in a direction that is perpendicular to the direction of the top surface of the pouch-type bare cell; and a protecting circuit module support part provided between the top case and the protecting circuit module wherein the protecting circuit module support part is resilient so as to absorb forces being transmitted between the top case and the protecting circuit module to inhibit damage to the protecting circuit module as a result of external forces exerted against the battery pack and wherein the opening in the top case is greater in width than the thickness of the protecting circuit module support part and the protecting circuit module when stacked together and wherein the electrode lead extends into the top case and is connected to the protecting circuit module via the opening in the top case.

12. The battery pack of claim 11, wherein the protection circuit module support part is formed of at least one selected from the group consisting of foam, rubber and glue.

13. The battery pack of claim 11, wherein the protecting circuit module support part is formed to face a thermal fuse or positive temperature coefficient (PTC) component on the protecting circuit module.

14. The battery pack of claim 11, wherein the top case is integrally formed with the protecting circuit module support part.

* * * * *